United States Patent [19]

Upp et al.

[11] Patent Number: 5,297,180
[45] Date of Patent: Mar. 22, 1994

[54] DIGITAL CLOCK DEJITTER CIRCUITS FOR REGENERATING CLOCK SIGNALS WITH MINIMAL JITTER

[75] Inventors: Daniel C. Upp, Southbury, Conn.; Dan H. Wolaver, Brookfield, Mass.

[73] Assignee: TranSwitch Corporation, Shelton, Conn.

[21] Appl. No.: 805,465

[22] Filed: Dec. 10, 1991

Related U.S. Application Data

[63] Continuation-in-part of PCT/US90/0742, Feb. 8, 1990, which is a continuation-in-part of Ser. No. 439,097, Nov. 17, 1989, Pat. No. 5,033,064.

[51] Int. Cl.$^5$ .............................................. H04L 7/00
[52] U.S. Cl. ..................................... 375/112; 375/118; 370/102; 370/105.3
[58] Field of Search ................. 375/118, 112; 370/102, 370/105.3

[56] References Cited

U.S. PATENT DOCUMENTS

| | | | |
|---|---|---|---|
| 4,053,175 | 10/1977 | Drapkin | 179/15 |
| 4,159,535 | 6/1979 | Fuhrman | 364/900 |
| 4,347,620 | 7/1982 | Black et al. | 375/112 |
| 4,429,386 | 1/1984 | Graden | 375/118 X |
| 4,434,498 | 2/1984 | Mathieu | 375/118 X |
| 4,551,830 | 11/1985 | Huffman | 370/15 |
| 4,667,324 | 5/1987 | Graves | 370/102 |
| 4,674,088 | 6/1987 | Grover | 370/100 |
| 4,685,101 | 8/1987 | Segal et al. | 370/84 |
| 4,833,673 | 5/1989 | Chao et al. | 370/94 |
| 4,964,142 | 10/1990 | Annamalai | 375/118 |

*Primary Examiner*—Curtis Kuntz
*Assistant Examiner*—Tesfaldet Bocure
*Attorney, Agent, or Firm*—David P. Gordon

[57] ABSTRACT

A digital clock dejitter circuit has a RAM for receiving an incoming gapped signal, a digital, fractional RAM fullness gauge for tracking the average input and output rates to and from the RAM and for generating therefrom a control indication, and a controllable digital frequency generator for receiving a fast clock signal and the control indication, and for providing therefrom a substantially jitter-free clock signal at the same nominal rate as the incoming gapped signal. The RAM fullness gauge has write and read counters which track the movement of data into and out of the RAM, and a subtractor for taking the difference of the counters to obtain the integer value of the RAM depth. The controllable digital frequency generator has an adder, a register, and a fast clock counter (FCC) which provides the fullness gauge with a fractional digital indication of the RAM depth. The adder has a carry output fed to the FCC to control whether the FCC divides by x or $x+1$, and a remainder output fed to the register and then fed back as an input to the adder. The adder also receives the control indication from the fullness gauge as an input. FCC inputs include the fast clock, and the carry output of the adder. The FCC outputs are a read signal for causing a byte to be read from the RAM at the end of a count cycle, and the fast clock count used for fractional fullness.

20 Claims, 1 Drawing Sheet

DIGITAL CLOCK DEJITTER CIRCUITS FOR REGENERATING CLOCK SIGNALS WITH MINIMAL JITTER

This is a continuation-in-part of U.S. Patent Ser. No. 000,742, filed Feb. 8, 1990, now PCT/US90/06742 which is a continuation-in-part of U.S. Patent Ser. No. 07/439,097, filed Nov. 17, 1989, now issued as U.S. Pat. No. 5,033,064, both of which are hereby incorporated by reference herein in their entireties.

BACKGROUND OF THE INVENTION

This invention relates generally to digital circuits for regenerating a jittered clock signal. More particularly, this invention relates to a dejitter circuit which receives a jittered telecommunications signal, and which uses a clock source of higher frequency for regenerating the telecommunications signal at the rate of the incoming telecommunications signal.

DS0, DS1, DS2, and DS3 telecommunications signals are well defined according to CCITT specifications. Essentially, a DS0 signal is a signal having a bit rate of 64 Kbits/sec. A DS1 signal is composed of twenty-four DS0 segments plus overhead for a total bit rate of 1.544 Mbits/sec (plus or minus approximately 200 b/sec). In turn, four DS1 signals plus some overhead (bit stuffing) constitute a 6.312 Mb/sec DS2 signal, and four DS2 signals plus some additional overhead constitutes a 44.736 Mb/sec DS3 signal.

DS3 signals are commonly used between central offices for high speed communication. When the DS3 signal is received, it is often demultiplexed into its seven composite DS2 signals, with the bit stuffing utilized for control and essentially removed from the DS2 signals. In turn, the DS2 signals are often demultiplexed into their four composite DS1 signals with the DS2 bit stuffing utilized for control and essentially removed from the resulting DS1 signals. Each resulting DS1 signal has a bit rate of approximately 1.544 Mb/sec plus or minus 200 b/sec. However, because in generating the DS1 signal the overhead or stuffing bits are removed, the bit stream of the DS1 signal is gapped or "jittered". Additional jitter termed "transport" or "systematic" jitter is also found in the DS1 signal due to the fact that all systems introduce noise into the signals which they are carrying. Jitter is undesirable as it can introduce error in the decoding of the signal.

With the advent of the optical network, additional telecommunication signals have been defined according to CCITT specifications. The basic SONET signal is an STS-1 signal having a bit rate of 51.84 Mb/sec. An STS-3 signal (155.52 Mb/sec) has three times the bit rate of the STS-1 signal. Often the STS-1 or STS-3 signals are used to carry the data payloads of DS0, DS1, DS2 and DS3 signals. In fact, the STS signals can also be required to carry the data payload of standard European signals such as a 2.048 Mb/sec signal.

Standard devices such as phase locked loops are known in the art for tracking signal rates and for generating a clock of the nominal received rate for eliminating jitter. Phase locked loops however, have several drawbacks including expense and the requirement of analog implementation. The subject invention eliminates the need for an analog phase locked loop through the use of a small amount of digital circuitry capable of implementation on a small section of an LSI circuit.

SUMMARY OF THE INVENTION

It is therefore an object of the invention to provide a digital circuit for regenerating a clock signal for a jittered telecommunications signal at the nominal rate of the jittered telecommunications signal.

It is another object of the invention to provide a digital dejitter circuit where the rate of the generated output signal is finely tuned to the rate of the incoming signal and has minimal jitter.

It is a further object of the invention to provide a digital phase lock loop circuit which follows a nominally 2.048 MHz gapped telecommunications signal and generates a nominally 2.048 MHz ungapped clock signal from a 58.32 MHz signal.

In accord with the objects of the invention, the digital clock dejitter circuit broadly comprises a FIFO means for receiving the incoming gapped signal, a digital, fractional FIFO fullness gauge means for tracking the average input and output rates to and from the FIFO means and for generating therefrom a control indication, and a controllable digital frequency generator means for receiving a fast clock signal and the control indication, and for providing therefrom a substantially jitter-free clock signal at the same nominal rate as the incoming gapped signal.

The FIFO means is preferably implemented with a RAM. The digital, fractional FIFO fullness gauge means is preferably implemented with a write counter which tracks the writing of bytes into the RAM, a read counter which tracks the reading of bytes out of the RAM, a comparator (subtraction) means for taking the difference of the write and read counters to obtain the FIFO length or depth, and a fast clock divider means (which is part of the controllable digital frequency generator means) for providing a digital indication regarding how close the system is to the reading of another byte from the FIFO. Effectively, the comparator provides the FIFO gauge means with a digital integer value of the bytes in the FIFO, while the fast clock counter means provides the FIFO gauge means with a fractional value. The FIFO fullness indication is a control indication which is used to slightly change the nominal frequency generated by the controllable digital frequency generator means. The control indication is a digital signal which is either processed to represent the desired output frequency of the system, or is processed to represent a change in output frequency of the system. In any event, the processed control indication is fed to the controllable digital frequency generator means.

The controllable digital frequency generator means is preferably implemented with an adder, a register, and the fast clock divider. The adder has at least two inputs and two outputs. The outputs include a carry output which is fed to the fast clock divider, and a sum (remainder) output which is fed to the register. The two inputs include the remainder which is provided to the adder by the register, and the processed control indication from the FIFO gauge means. Similarly, the fast clock divider has two inputs and two outputs. The two inputs are the fast clock, and the carry output of the adder. The fast clock divider receives the fast clock and counts in order to conduct a divide by value x—or divide by value x+1. The carry output of the adder is used to determine whether the fast clock divider divides by x or by x+1. The outputs of the counter are a read signal which causes a byte to be read out from the FIFO at the end of a count cycle, and a fast clock count which is used as the fractional value by the FIFO gauge means.

By arranging the inputs (other than the remainder) to the adder to normally (i.e., in steady state) sum to a value equal to the ratio of the number of times a divide by x is required to the sum of the number of times a divide by x plus the number of times a divide by x+1 is required, and by causing a divide by x if the carry value is zero and a divide by x+1 if the carry value is one, the carry output will cause the fast clock divider to output the nominally desired frequency. When the FIFO fills or depletes, the control signal from the FIFO fullness gauge means changes. Thus, one input to the adder is changed. Depending on the direction of the change, additional or fewer carries will result over a period of time, and the output frequency generated by the fast clock divider will change accordingly.

To dejitter a jittered European telecommunications 2.048 Mb/sec signal by using a faster STS-3 input clock signal, a divide by twenty-eight—divide by twenty-nine circuit which receives a 58.32 MHz clock signal (which is three/eighths the rate of a 155.52 Mb/sec STS-3 clock signal) is utilized. To generate exactly a 2.048 Mb/sec signal from the 58.32 MHz signal, a divide by 28.4765625 of the fast clock is required. Thus the divide by twenty-nine should occur exactly 47.65625% of the time and the divide by twenty-eight should occur exactly 52.34375% of the time. In order to guarantee such an arrangement, 0.4765625 (in digital form=0.0111 1010 0000 0000 0) is added to the adder each cycle. Whenever the carry out is one (which would be 47.65625% of the time), the next divide cycle is divide by twenty-nine. Whenever the carry out is zero (i.e., 52.34375% of the time), the next divide cycle is divide by twenty-eight.

Additional objects and advantages of the invention will become apparent to those skilled in the art upon reference to the detailed description taken in conjunction with the provided drawings.

DETAILED DESCRIPTION OF THE PREFERRED EMBODIMENT

Figure 1:
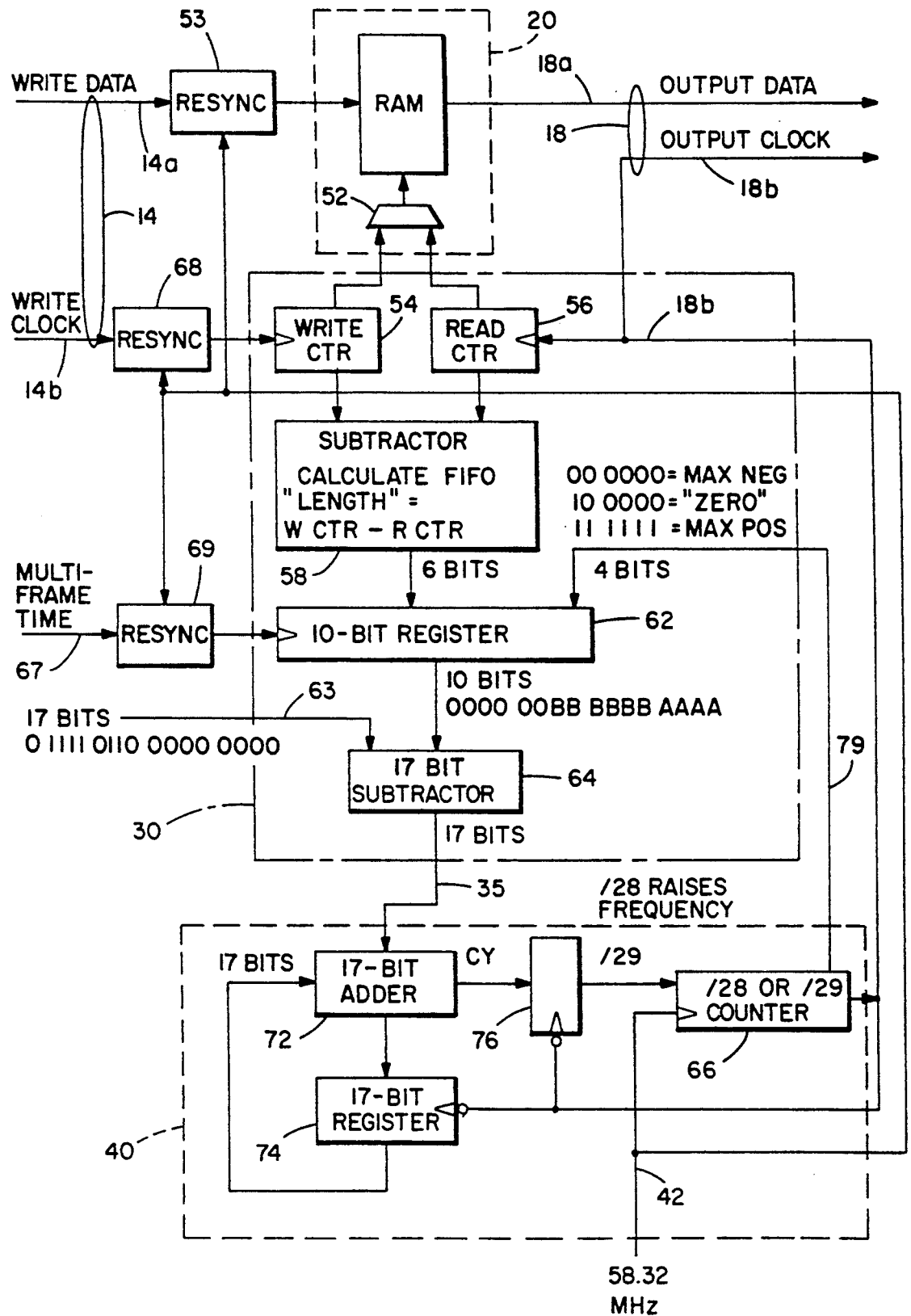
FIG. 1 is a block diagram of the preferred digital clock dejitter circuit of the invention.

Turning to FIG. 1, a block diagram of the preferred digital clock dejitter circuit 10 of the invention is seen. The digital clock dejitter circuit tracks the frequency of a jittered nominally 2.048 Mb/sec input signal 14, and generates therefrom a substantially jitter-free output signal 18 which tracks the frequency of the input signal.

The digital clock dejitter circuit 10 of the invention includes a FIFO means 20, a digital, fractional FIFO fullness gauge means 30 for tracking the average input and output rates to and from the FFO means 20 and for generating therefrom a control indication 35, and a controllable digital frequency generator means 40 for receiving a fast clock signal 42 and the control indication 35, and for providing therefrom a low jitter output clock signal 18 at the same nominal rate as the incoming gapped signal 14.

The FIFO means is preferably implemented with a RAM 50 and an address multiplexer 52. Received data 14a is resynchronized by resynchronizer 53 according to the phase of the 58.32 MHz fast clock, and input into the RAM 50 at the address dictated by the write counter 54 (via multiplexer 52). Effectively, then, write counter 54 is a counter which addresses the RAM 50 and tracks the location of the last bit to be written into the RAM. Write counter 54 is updated by the write clock 14b of the incoming signal 14. Similarly, data to be read from the RAM 50 and output on data line 18a is addressed by the read counter 56 (via multiplexer 52). Read counter 56 therefore is a counter which addresses the RAM 50 and tracks the location of the last bit to be read from the RAM 50. As will be discussed in more detail hereinafter, the read counter 56 is updated by the substantially jitter free output clock 18b generated by the controllable digital frequency generator means 40.

The digital, fractional FIFO fullness gauge means 30 comprises the write counter 54 which tracks the writing of bits into the RAM, the read counter 56 which tracks the reading of bits out of the RAM, a subtraction means 58, a register 62 for storing the results of the subtraction means and fractional values supplied by a counter of the controllable digital frequency generator, and a second subtractor 64. Subtractor 58 takes the difference of the write and read counters 54, 56 to obtain the FIFO length or depth; i.e., the number of bits contained in the RAM 20. Effectively, then, the subtractor 58 provides (in a continuous manner) an exact integer gauge of the depth of data contained in the RAM. Because, in the preferred embodiment the RAM can hold sixty-four bits, six bits will describe the state of the RAM, with 000000 indicating that the RAM has no bits being stored, and 111111 indicating that the RAM is full with data bits.

The six bit integer value determined by the subtractor 58 is provided to the ten bit register 62 as the six most significant bits (msb's) of the ten bit register 62. The ten bit register 62 samples the six bits at the multiframe frame rate (i.e., every five hundred microseconds for a SONET virtual tributary multiframe), as the multiframe clock 67 which is synchronous with the write clock 14b is used to cause the ten bit register 62 to accept data. The other four bits (least significant bits) to be stored by the ten bit register are provided by a first output of the divide by twenty-eight—divide by twenty-nine counter block 66 of the controllable digital frequency generator means 40. A second output of the counter block 66 is used to pulse the read counter 56 and cause data to be read out of RAM 20. Thus, the count of the counter block 66 at any given time is indicative of how close the counter block is to causing a read of the RAM. In other words, at the write clock edge as resynchronized by resynchronizer 68 which corresponds to the multiframe clock edge as resynchronized by resynchronizer 69, when the ten bit register receives the six bits from the subtractor 58 and the four bits from the counter block 66, the count of the counter block 66 effectively provides a fractional value for the RAM depth. So, the ten bits stored in the ten bit register 62 provide an extremely fine indication of the RAM depth or fullness.

Two additional points regarding the fractional RAM depth monitoring are of note. First, because counter block 66 is actually a five bit counter, only the four msb's of the count are used as the lsb inputs to the ten bit register 62. Thus, in the preferred embodiment, the fullness gauge is not as accurate as might be possible. Second, because the counter block 66 is only counting to twenty-eight or twenty-nine, rather than thirty-two, the fractional representation of fullness is not exactly linear. The effect of the nonlinearity is to cause the bandwidth of the digital phase-locked loop to vary slightly. However, the arrangement as provided is still an extremely good indication of RAM fullness.

The output of the ten bit register 62 is effectively a control indication regarding the fullness of the RAM 20. As described hereinafter, the control indication is used to slightly change the nominal frequency generated by the controllable digital frequency generator means 40. The control indication is a digital signal which in the preferred embodiment is processed to represent the desired output frequency of the system. To process the control indication, the ten bit value stored in the ten bit register 62 is fed to a seventeen bit subtractor 64 which effectively subtracts the ten bit value output from the ten bit register from a preset input value 0111 1011 0000 0000 0 (indicated at 63). When the ten bit value is 10 0000 0000, the RAM is exactly half full, and the subtracted value (i.e., processed control signal) 35 output by the subtractor 64 is 0111 1010 0000 0000 0; which is the digital value for the decimal fraction 0.4765625. As will be described hereinafter, 0.4765625 is a desired value which is used by the controllable digital frequency generator means 40 to generate an exact 2.048 Mb/sec signal. When the ten bit value provided by the ten bit register 62 is greater than 10 0000 0000, it is indicative of the fact that the RAM is more than half full and that data is being written into the RAM faster than it is being read from the RAM 20. As a result, the output of subtractor 64 will be less than 0111 1010 0000 0000 0 (i.e., less than 0.4765625), and will cause the controllable digital frequency generator means 40 to increase the output frequency of the system. Similarly, if the output of the subtractor 64 is less than 10 0000 0000, the RAM is less than half full, and the data is being read from the RAM faster than data is written into the RAM. As a result, the output of the subtractor 64 will be more than 0.4765625, and the controllable digital frequency generator means 40 will decrease the output frequency accordingly.

The controllable digital frequency generator means 40 is preferably implemented with a seventeen bit adder 72, a seventeen bit register 74, and the divide block 66. The seventeen bit adder 72 has two inputs and two outputs. The outputs include a carry output which is fed to the fast clock divider via flip-flop 76, and a sum (remainder) output which is fed to the seventeen bit register 74. The two inputs include the remainder which is provided to the adder 72 by the seventeen bit register 74, and the processed control indication 35 from the FIFO gauge means 30. The counter block 66 (which is a fast clock divider) also has two inputs and two outputs. The two inputs are the 58.32 MHz fast clock 42, and the divide by twenty-eight—divide by twenty-nine signal which is the output of flip-flop 76 which is responsive to the carry output of the adder 72. The outputs of the counter block 66 are a read signal 18b which causes a byte to be read out from the RAM 20 at the end of a count cycle, and a fast clock count 79 which is used as aforedescribed as the fractional value of the RAM fullness.

By arranging the control (feedback) input 35 to the adder 72 to be a digital value equal to the ratio of the number of times a divide by x is required to the number of times a divide by x+1 is required, the carry output will cause the fast clock divider (counter block) 66 to output the nominally desired frequency as signal 18b. For example, to provide a European telecommunications 2.048 Mb/sec from a 58.32 MHz fast clock signal, a fast clock divide by 28.4765625 is required. Thus, a divide by twenty-eight—divide by twenty-nine circuit 66 is provided with the divide by twenty-eight occurring exactly 47.65625% of the time and the divide by twenty-nine occurring exactly 52.34375% of the time. In order to guarantee such an arrangement, a control input value of 0.4765625 (in digital form=0.0111 1010 0000 0000 0) is added to the seventeen bit adder 72 each cycle. Whenever the carry out is one (which will occur exactly 47.65625% of the time), the next divide cycle is divided by twenty-nine. Whenever the carry out is zero (which will occur exactly 52.34375% of the time), the next cycle is divide by twenty-eight. In this manner, a non-jittered output signal of exactly 2.048 Mb/sec is generated by the controllable digital frequency generator means 40.

Because the control input 35 to the frequency generator means 40 is responsive to the fullness of the FIFO RAM 20, the output frequency of the frequency generator means 40 changes if the average output data rate (i.e., read data) is not exactly equal to the average input data rate (i.e., write data). When the data RAM 20 is receiving data at a greater rate than data is being read out from the RAM, the fullness gauge of the RAM will increase, and the control signal value 35 will decrease. A decrease in the control signal value causes the seventeen bit adder 72 to output fewer carry signals, which in turn causes the counter block to divide by twenty-nine less and the divide by twenty-eight more often. With more divide by twenty-eights, and fewer divide by twenty-nines, the divide block effectively divides by a value which is closer than before to twenty-eight, and the output frequency increases. An increase in output frequency causes data to be read from the FIFO slightly faster; i.e., to match the average input data rate. Conversely, when the data RAM 20 is reading data from the data RAM 20 at a greater rate than data is being written into the RAM, the fullness gauge of the RAM will decrease, and the control signal value 35 will increase. An increase in the control signal value causes the seventeen bit adder 72 to output carry signals more often, which in turn causes the counter block 66 to divide by twenty-nine more often and to divide by twenty-eight less often. With more divide by twenty-nines and fewer divide by twenty-eights, the divide block divides by a value which is closer than before to twenty-nine, and the output frequency decreases. A decrease in output frequency causes data to be read from the FIFO slightly slower than before. Thus, the output data rate is slowed to match the input data rate.

It will be appreciated by those skilled in the art that with the provided circuitry, a new processed control signal for effecting change in output frequency is generated once every one thousand twenty-four 2.048 MHz cycles (i.e., every five hundred microseconds which equals the SONET multiframe rate). However, even with a change in the control signal occurring at most once every 1024 cycles, it will be appreciated that the output frequency changes even slower, as it may take numerous seventeen bit adder cycles before a carry will occur where it would otherwise not have occurred, or vice versa. Thus, the change in output frequency is relatively slow compared to clock rates. On the other hand, the change is accomplished with a minimum of jitter, and is extremely fast in real time. Specifically, the bandwidth of the digital phase locked loop is $f_o/2^N$, where $f_o$ is the output frequency (2.048 MHz in this example) and N is the number of bits in adder 72 (seventeen in this example).

There has been described and illustrated herein a digital clock dejitter circuit which regenerates with minimal jitter a clock signal at the frequency of an incoming jittered clock signal. While particular embodiments of the invention have been described, it is not intended that the invention be limited thereto, as it is intended that the invention be as broad in scope as the art will allow and that the specification be read likewise. Thus, while particular circuitry has been set forth for the FIFO means, the fullness gauge means, and the controllable digital frequency generator means, it will be appreciated that other circuitry could be utilized. For example, instead of a RAM, a shift register FIFO could be utilized; preferably, with the output being obtainable from more than one register location. The difference between write and read locations would then be dependent on the register from which the output was taken. Similarly, while a six bit subtractor was utilized for the integer fullness gauge, four bits were utilized for the fractional fullness gauge, and a seventeen bit subtractor was utilized to provide a control signal to the controllable digital frequency generator, it will be appreciated that other numbers of bits could be utilized. In fact, all that is required is that some digital control signal be generated which is indicative of the FIFO fullness to a fractional value such that a change in the output frequency can be effected. Thus, the control signal generated could be a data signal; i.e., a change in fullness signal, which would be generated by comparing a present fullness signal to a previous fullness signal. The delta signal could then be fed as a control to the digital frequency generator to change its output. Similarly, rather than processing the fractional FIFO length value to generate a seventeen bit value for input to the seventeen bit adder, it will be appreciated that the fractional FIFO length value could be supplied directly to the seventeen bit summer, along with an "offset" value (e.g., 0111 1011 0000 0000 0), and the remainder, and all three could be summed together.

Those skilled in the art will further appreciate that while a block diagram representative of a digital clock dejitter circuit for a nominal 2.048 MHz signal was provided, the basic concepts apply to regenerating a clock of any rate from a higher rate clock. All that is required to provide a circuit which regenerates a different clock rate is that: 1) the ratio of the nominal clock and the fast clock be taken to determine the values for the divide by x—divide by x+1 counter, and 2) either an offset value equal to a ratio of the number of divides by x (or x+1) and the total number of divides in a cycle be supplied with a correction control signal, or that the correction control signal be processed in order to supply the proper offset value to the adder of the digital frequency generator. Also, it will be appreciated that while the preferred circuit of the invention utilized a subtractor (64) which caused the control signal (35) to decrease in value when the fullness gauge of the RAM increased, it will be appreciated that an adder could be utilized instead of the subtractor. With such an arrangement, the preset value (63) would clearly be a different value, and the carry output of the adder (72) of the frequency generator means (40) would cause a divide by x rather than a divide by x+1. In this manner, negative feedback would be maintained, as an increase in RAM fullness would cause a larger control value to be provided to the adder of the frequency generator means which in turn would cause more divide by x cycles, thereby increasing the output frequency. It will therefore be appreciated by those skilled in the art that yet other modifications could be made to the provided invention without deviating from its spirit and scope as so claimed.

What is claimed is:

1. Apparatus for regenerating a jittered stream of data of a first standard telecommunications signal, said apparatus having a second telecommunications clock signal as an input thereto, said second telecommunications clock signal being a fast clock signal at a substantially faster rate than the rate of said first standard telecommunications signal, comprising;
   a) FIFO means for receiving said jittered stream of data, and for providing said data for output from said apparatus;
   b) a digital, integer/fractional FIFO fullness gauge means coupled to said FIFO means for tracking the relative rates at which said FIFO means receives and outputs said data and for generating therefrom a first control indication which is responsive to an integer fullness of said FIFO means, and for generating from said first control indication and from an indication of a fractional fullness of said FIFO means, a second control indication; and
   c) a controllable digital frequency generator means coupled to said digital integer/fractional FIFO fullness gauge means for receiving said fast clock signal and said second control indication, and for generating therefrom a substantially jitter-free output clock signal at the same nominal rate as said first telecommunications signal, said substantially jitter-free output clock signal being coupled to said FIFO means in order to cause said FIFO means to provide said data for output from said apparatus in a substantially jitter-free manner at said nominal rate.

2. Apparatus according to claim 1, wherein:
said FIFO means comprises a data RAM.

3. Apparatus according to claim 2, wherein:
said digital, integer/fraction FIFO fullness gauge means comprises a write counter which tracks the writing of bytes of said first standard telecommunications signal into said RAM and provides a first count, a read counter which tracks the reading of said bytes out of said RAM and provides a second count, and a comparator means for comparing said first and second counts to provide a plurality of bits representing said integer fullness of said FIFO means.

4. Apparatus according to claim 3, wherein:
said controllable digital frequency generator means comprises a fast clock counter means for dividing said fast clock by different first and second values in order to provide said substantially jitter-free output clock signal, and for providing a digital count of said fast clock, said digital count comprising a plurality of bits, wherein at least two of said plurality of bits of said digital count comprise said fractional fullness of said FIFO means.

5. Apparatus according to claim 4, wherein:
said digital integer/fractional FIFO fullness gauge means further comprises a register means for receiving a digital representation of said integer fullness and said fractional fullness.

6. Apparatus according to claim 5, wherein:
said controllable,, digital frequency generator means further comprises an adder means, and second register means, said adder means having a sum output and a carry output, said sum output being provided to said second register means and said carry output being provided to said fast clock counter means to control by which of said different first and second values said fast clock counter means divides, said second register means having an output with said output of said second register means and said second control indication being inputs to said adder means.

7. Apparatus according to claim 6, wherein:
said different first and second values of said fast clock counter are x and x+1, where x is an integer greater than one.

8. Apparatus according to claim 7, wherein:
said second control indication has a fractional value substantially equal to a value equal to one of
a fractional remainder obtained when dividing said fast rate clock by said rate of said first standard telecommunications signal, and
one minus the fractional remainder obtained when dividing said fast rate clock by said rate of said first standard telecommunications signal.

9. Apparatus according to claim 8, wherein:
said second control indication has a fractional value substantially equal to a fractional remainder obtained when dividing said fast rate clock by said rate of said first standard telecommunications signal, and when said adder means provides a carry output indicating a carry, said fast clock counter means counts to x+1, and when said adder means provides a carry output indicating no carry, said fast clock counter means counts to x.

10. Apparatus according to claim 8, wherein:
said second control indication has a fractional value substantially equal to one minus a fractional remainder obtained when dividing said fast rate clock by said rate of said first standard telecommunications signal, and when said adder means provides a carry output indicating a carry, said fast clock counter means counts to x, and when said adder means provides a carry output indicating no carry, said fast clock counter means counts to x+1.

11. Apparatus according to claim 5, wherein:
said digital integer/fractional FIFO fullness gauge means further comprises a second comparator means for comparing contents of said register means with a predetermined value and for providing said second control indication as a result thereof.

12. Apparatus according to claim 6, wherein:
said adder means has a third input, said third input comprising a fractional value substantially equal to a value equal to one of
the fractional remainder obtained when dividing said fast rate clock by said rate of said first standard telecommunications signal, and
one minus the fractional remainder obtained when dividing said fast rate clock by said rate of said first standard telecommunications signal.

13. Apparatus according to claim 1, wherein:
said controllable digital frequency generator means comprises a fast clock counter means for dividing said fast clock by different first and second values in order to provide said substantially jitter-free output clock signal.

14. Apparatus according to claim 13, wherein:
said fast clock counter means further provides a digital count of said fast clock, said digital count comprising a plurality of bits, wherein at least two of said plurality of bits of said digital count comprise said fractional fullness of said FIFO means.

15. Apparatus according to claim 14, wherein:
said controllable, digital frequency generator means further comprises an adder means, and register means, said adder means having a sum output and a carry output, said sum output being provided to said register means and said carry output being provided to said fast clock counter means to control by which of said different first and second values said fast clock counter means divides, said register means having an output with said output of said register means and said control indication being inputs to said adder means.

16. Apparatus according to claim 15, wherein:
said different first and second values of said fast clock counter are x and x+1, where x is an integer greater than one, and said control indication has a fractional value substantially equal to a value equal to one of
the fractional remainder obtained when dividing said fast rate clock by said rate of said first standard telecommunications signal, and
one minus the fractional remainder obtained when dividing said fast rate clock by said rate of said first standard telecommunications signal.

17. Apparatus according to claim 8, wherein:
said first standard telecommunications signal is a 2.048± Mb/sec signal,
said second telecommunications clock signal is a 58.32 MHz signal, x equals 28, and
said fractional remainder equals 0.4765625.

18. Apparatus according to claim 17, wherein:
said plurality of bits representing said integer fullness comprises six bits,
said at least two bits representing said fractional fullness comprises four bits,
said first register means is a register having at least ten bits,
said adder is a seventeen bit adder, and said second register is a seventeen bit register.

19. Apparatus according to claim 18, wherein:
said digital integer/fractional FIFO fullness gauge means further comprises a second comparator means for comparing contents of said a first register means with a predetermined value of 0111 1011 0000 0000 0 and for providing said second control indication as a result thereof to said seventeen bit adder.

20. Apparatus according to claim 16, wherein:
said first standard telecommunications signal is a 2.048± Mb/sec signal,
said second telecommunications signal is a 58.32 MHz signal, x equals 28, and
said fractional remainder equals 0.4765625.

* * * * *